Patented May 25, 1937

2,081,244

UNITED STATES PATENT OFFICE 2,081,244

MONOAZO DYES FOR COLORING CELLULOSE ESTERS

Georg Matzdorf and Erich Baumann, Dessau in Anhalt, Germany, assignors to General Aniline Works, Inc., New York, N. Y., a corporation of Delaware No Drawing. Application January 31, 1935, Serial No. 4,410. In Germany February 22, 1934

3 Claims. (Cl. 260—96)

The present invention relates to new monoazo dyes and to a process of manufacturing the same.

More particularly it relates to such dyes as suited for dyeing artificial silk made from cellulose esters.

It has been shown in U. S. Patent No. 1,673,301 that azo dyes which are produced by coupling any diazo compound, particularly of the benzene or naphthalene series, with an N-di(hydroxyalkyl) derivative of an aromatic amine are characterized by the clarity and fastness to washing, water and light of the dyeings which they produce on acetate silk. As examples were cited the dyes 4-nitraniline-azo-di(hydroxyethyl)-aniline, 3,4,5-trichloraniline-azo-di(hydroxyethyl)-aniline, 4-nitraniline-azo-di(hydroxyethyl)-3-amino-1-methylbenzene and 2.4-dinitraniline-azo-di(hydroxyethyl)-3-amino-1-methylbenzene.

The present invention is based on the observation that the fastness to light of the dyes of the kind described in the said U. S. patent, is particularly good, when the diazo compound of 4-nitro-2-chloro-aniline or 4-nitro-2.6-dichloraniline is coupled with a di(hydroxyalkyl)-aniline which contains a methyl group in 3-position. Instead of the chlorine the azo dyes made in accordance with the invention, may contain bromine. The dyeings obtained with these selective dyes on acetate silk have a fastness to washing and water which is equal to that of the dyes of the aforesaid specification.

The diazo compound of 4-nitro-2-chloro-1-amino-benzene has previously been coupled with a meta-toluene derivative containing only one hydroxyethyl group to obtain a dye; the dye, however, gives dyeings of a red tint which is bluer than that yielded by the dye obtained by coupling the meta-toluidine derivative having two hydroxyethyl groups and this has the result that the shade is shifted towards yellow.

As compared with the known azo dyes obtained from the same passive components, the dyes of the present invention are distinguished by their improved fastness to light and in part by their better fastness to sulfur.

The following examples illustrate the invention, the parts being by weight:—

*Example 1.*—A diazo solution, prepared in the usual manner from 17.3 parts of 4-nitro-2-chloro-1-amino-benzene, is caused to flow into a cold solution of 19.5 parts of di-(hydroxyethyl)-meta-toluidine in a mixture of 20 parts of hydrochloric acid of 23° Bé. and 600 parts of water. The mixture is buffered with sodium acetate for the completion of the coupling. The precipitated dye dyes acetate silk bluish ruby-red tints of excellent fastness to light.

*Example 2.*—The procedure is the same as in Example 1 but instead of the 4-nitro-2-chloro-1-aminobenzene the diazo solution of 21.7 parts of 4-nitro-2-bromo-1-aminobenzene is used. There is thus obtained a dye which dyes acetate silk clear ruby-red tints.

*Example 3.*—A diazo solution is prepared by stirring at 25 to 30° C. 20.7 parts of 2,6-dichloro-1-amino-4-nitrobenzene into a nitrosyl sulfuric acid, made by introducing 7 parts of sodium nitrite into 130 parts of concentrated sulfuric acid, and the mass is then diluted by pouring it upon ice. The filtered sulfuric acid diazo solution is run into a cold solution of 19.5 parts of di-(hydroxyethyl)-meta-toluidine in 20 parts of hydrochloric acid of 23° Bé. and 800 parts of water. The mixture is neutralized with the necessary quantity of caustic soda lye until the coupling is complete. The dye thus produced dyes acetate silk red-brown tints of very good fastness to light.

*Example 4.*—The procedure is the same as in Example 3 but for the 2,6-dichloro-1-amino-4-nitrobenzene there are substituted 29.6 parts of 2,6-dibromo-1-amino-4-nitrobenzene. The dye obtained also dyes acetate silk red-brown tints fast to light.

What we claim is:—

1. The dyes corresponding to the general formula—

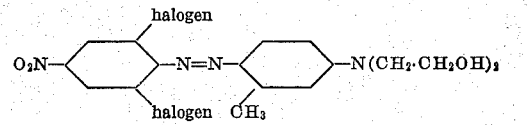

these dyes dyeing acetate silk red-brown tints of very good fastness to light.

2. The dye corresponding to the formula—

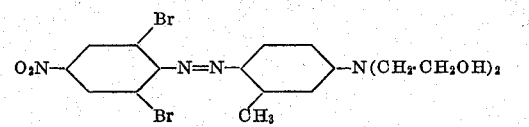

this dye dyeing acetate silk red-brown tints of a very good fastness to light.

3. The process which comprises diazotizing a para-nitraniline of the general formula—

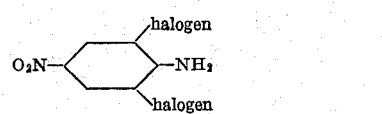

and coupling the diazo compound with 3-di-(hydroxyethyl)-amino-1-methylbenzene.

GEORG MATZDORF.
ERICH BAUMANN.